United States Patent [19]

Pellet et al.

[11] Patent Number: 4,880,760

[45] Date of Patent: Nov. 14, 1989

[54] DEWAXING CATALYSTS EMPLOYING NON-ZEOLITIC MOLECULAR SIEVES

[75] Inventors: Regis J. Pellet, Croton-on-Hudson; Jule A. Rabo, Armonk; Gary N. Long, Putnam Valley; Frank P. Gortsema, Pleasantville; Albert R. Springer, Yonkers, all of N.Y.

[73] Assignee: UOP, Des Plaines, Ill.

[21] Appl. No.: 85,844

[22] Filed: Aug. 17, 1987

Related U.S. Application Data

[62] Division of Ser. No. 682,942, Dec. 18, 1984, abandoned.

[51] Int. Cl.$^4$ .............................. B01J 29/06; B01J 27/18
[52] U.S. Cl. ................................... 502/67; 502/64; 502/208; 502/213; 502/214
[58] Field of Search ................. 502/67, 64, 208, 214

[56] References Cited

U.S. PATENT DOCUMENTS

| | | | |
|---|---|---|---|
| Re. 28,398 | 4/1973 | Chen et al. | 208/111 |
| 3,140,249 | 7/1964 | Plank et al. | 208/120 |
| 4,213,847 | 7/1980 | Chen et al. | 208/111 |
| 4,239,654 | 12/1980 | Gladrow et al. | 208/120 |
| 4,327,236 | 4/1982 | Klotz | 585/481 |
| 4,360,419 | 11/1982 | Miller | 208/111 |
| 4,390,414 | 6/1983 | Cody | 208/111 |
| 4,431,518 | 2/1984 | Angevine et al. | 208/111 |
| 4,434,047 | 2/1984 | Hensley, Jr. et al. | 208/111 |
| 4,440,871 | 4/1984 | Lok et al. | 502/214 |
| 4,443,329 | 4/1984 | Eberly, Jr. et al. | 208/111 |
| 4,486,296 | 12/1984 | Oleck et al. | 502/67 |
| 4,499,327 | 2/1985 | Kaiser | 585/640 |
| 4,500,651 | 2/1985 | Lok et al. | 502/208 |
| 4,512,875 | 4/1985 | Long et al. | 208/114 |
| 4,554,143 | 11/1985 | Messina et al. | 423/306 |
| 4,567,029 | 1/1986 | Wilson et al. | 423/306 |
| 4,588,846 | 5/1986 | Mitsui et al. | 585/835 |
| 4,605,790 | 8/1986 | Wojtkowski | 568/750 |
| 4,683,050 | 7/1987 | Ward | 208/110 |
| 4,686,029 | 8/1987 | Pellet et al. | 208/120 |
| 4,695,365 | 9/1987 | Ackelson | 208/89 |
| 4,710,485 | 12/1987 | Miller | 502/213 |
| 4,758,419 | 7/1988 | Lok et al. | 423/306 |

FOREIGN PATENT DOCUMENTS 0059059 9/1982 European Pat. Off. .
0209997 1/1987 European Pat. Off. .

OTHER PUBLICATIONS

Derouane, "Molecular Shape Selective Catalysts by Zeolites", Zeolites: Science and Technology, Martinus Nijhoff Publ., pp. 347–371; 1984. 1983).
Breck's *Zeolite Molecular Sieves*, p. 529 (John Wiley, 1974).
*Petroleum Refining*, Gary and Handwerk, Chap. 13 (Marcel Dekker, Inc., New York, 1984).
"Selective Hydrocracking of n-Paraffins in Jet Fuels", Chen and Garwood, Ind. Eng. Zhem. Process Des. Dev., vol. 17, No. 4, pp. 513–518 (ACS, 1978).
"New Process Cuts Pour Point of Distillates" by Chen et al., (Oil & Gas Journal, Jun. 6, 1977), p. 75.

*Primary Examiner*—Carl F. Dees
*Attorney, Agent, or Firm*—Vincent J. Vasta, Jr.

[57] ABSTRACT

Dewaxing processes for hydrocarbon feedstocks are disclosed using novel catalysts comprising non-zeolitic molecular sieves, such as the silicoaluminophosphates of U.S. Pat. No. 4,440,871. The products of the instant dewaxing processes are characterized by lower pour points than the hydrocarbon feedstock.

26 Claims, 2 Drawing Sheets

FIG. 1

FIG. 2

DEWAXING CATALYSTS EMPLOYING NON-ZEOLITIC MOLECULAR SIEVES

This is a division of application Ser. No. 682,942 filed Dec. 18, 1984, now abandoned.

FIELD OF THE INVENTION

The present invention relates to dewaxing and hydrodewaxing catalysts comprising non-zeolitic molecular sieves, as hereinafter described and to processes employing such catalysts.

BACKGROUND OF THE INVENTION

Dewaxing and hydrodewaxing processes are employed in the refining industry to treat petroleum fractions having initial boiling points over about 350° F. to improve their pour point. The improvement in pour point is generally effected by selective removal of paraffinic hydrocarbons. Since the pour point of liquid hydrocarbon fuels, e.g., diesel fuels and other light gas oil fractions, are strictly controlled, the pour points specification of such fuels must be met if such are to be employed in their intended use.

The need to reduce the pour point of petroleum fractions has resulted in the development of numerous dewaxing and hydrodewaxing processes wherein the pour points of petroleum fractions are reduced by selective removal of paraffinic hydrocarbons. Processes relating to dewaxing and hydrodewaxing are well known in both the patent and scientific literature. Such processes have employed crystalline aluminosilicates as catalysts. For example, see U.S. Pat. Nos. 3,140,249, 3,140,252, 3,140,251, 3,140,253, 3,956,102 and 4,440,991. These and other patents disclose the use of various crystalline aluminosilicates as catalysts for dewaxing processes.

Although a large number of zeolite materials have been disclosed as employable as catalysts for dewaxing and hydrodewaxing catalysts, the use of crystalline non-zeolitic molecular sieves has not received significant attention. This lack of attention is attributable to the scarcity of molecular sieves other than crystalline aluminosilcates. One disclosure of a catalyst containing a crystalline silicate, as opposed to a crystalline aluminosilicate, is disclosed in U.S. Pat. No. 4,441,991.

The instant invention provides for catalytic dewaxing and hydrodewaxing of hydrocarbon feedstocks by contacting such with catalysts comprising non-zeolitic molecular sieves, as hereinafter described.

SUMMARY OF THE INVENTION

The present invention relates to catalytic dewaxing and hydrodewaxing (hereinafter jointly referred to as "dewaxing") processes and the catalysts employed in such processes. The catalysts comprise: (1) at least one non-zeolitic molecular sieve, as hereinafter described; and (2) optionally, and in the instance of hydrodewaxing at least one hydrogenation component; and (3) optionally, particles of a traditional dewaxing catalyst having catalytic activity for dewaxing and/or hydrodewaxing hydrocarbon feedstocks at effective dewaxing conditions, e.g., particles of a traditional dewaxing catalyst containing a zeolitic aluminosilicate(s) of the type generally employed in such dewaxing catalysts. The non-zeolitic molecular sieves employed in the instant invention, i.e., catalysts and processes, are characterized in their calcined form by an adsorption of isobutane of at least 2 percent by weight at a partial pressure of 500 torr and a temperature of 20° C. The traditional dewaxing catalyst component, e.g., a zeolitic aluminosilicate, if any, is characterized as being a dewaxing catalyst component, such as heretofore traditionally employed in hydroprocessing processes, e.g., the various forms of zeolite Y, silica-alumina, and hydrogenation components. The non-zeolitic molecular sieves employed in this invention are unique in that such are not zeolitic aluminosilicates, as heretofore employed in the prior art, but are specific non-zeolitic molecular sieves, as hereinafter described.

DETAILED DESCRIPTION OF THE INVENTION

Dewaxing and hydrodewaxing processes involve converting high boiling and high pour point paraffinic waxes and hydrocarbons into lower boiling lower pour point products. Further, hydrodewaxing involves hydrogenating unsaturates in the product. The term "dewaxing" is employed herein to generally mean the removal of hydrocarbons which readily solidify from petroleum stocks as waxes and includes catalytic dewaxing and hydrodewaxing.

The catalysts of the instant invention have been observed to convert normal paraffins in the hydrocarbon products and, accordingly, reduce the pour point of such products, i.e., act as dewaxing catalysts. This reduction in the pour point by selective normal paraffin conversion is of commercial significance since distillate products have rigid specifications on the acceptable pour point.

The non-zeolitic molecular sieves employed in the instant invention are selected from the hereinafter described group of non-zeolitic molecular sieves as being characterized in their calcined form by an adsorption of isobutane of at least 2 percent by weight at a partial pressure of 500 torr and a temperature of 20° C. The non-zeolitic molecular sieves are preferably also characterized in their calcined form by an adsorption of triethylamine of from zero to less than 5 percent by weight, preferably less than 3 percent by weight, at a partial pressure of 2.6 torr and a temperature of 22° C.

NON-ZEOLITIC MOLECULAR SIEVES ("NZ—MS")

The term "non-zeolitic molecular sieves" or "NZ—MS" is defined in the instant invention to include the "SAPO" molecular sieves of U.S. Pat. No. 4,440,871, "ELAPSO" molecular sieves as disclosed in U.S. Ser. No. 600,312, filed Apr. 13, 1984 now U.S. Pat. No. 4,793,984 and certain "MeAPO", "FeAPO", "TiAPO" and "FCAPO" molecular sieves. Crystalline metal aluminophosphates (MeAPOs where "Me" is at least one of Mg, Mn, Co and Zn) are disclosed in U.S. Ser. No. 514,334, filed July 15, 1983 now U.S. Pat. No. 4,567,029; crystalline ferroaluminophosphates (FeAPOs) are disclosed in U.S. Ser. No. 514,335, filed July 15, 1983 now U.S. Pat. No. 4,554,143; titanium aluminosphosphates (TAPOs) are disclosed in U.S. Ser. No. 480,738, filed Mar. 31, 1983 now U.S. Pat. No.

4,500,651; and non-zeolitic molecular sieves ("ELAPO") are disclosed U.S. Ser. No. 599,978, filed Apr. 13, 1984 (now abandoned). Reference to figures in the description of the NZ—MSs is to the figures in said copending applications. The aforementioned copending applications are incorporated herein by reference thereto.

"ELAPSO" molecular sieves are described in copending U.S. Ser. No. 600,312, filed Apr. 13, 1984, as crystalline molecular sieves having three-dimensional microporous framework structures of $ELO_2$, $AlO_2$, $PO_2$, $SiO_2$ oxide units and having an empirical chemical composition on an anhydrous basis expressed by the formula:

$$mR:(EL_wAl_xP_ySi_z)O_2$$

wherein

"R" represents at least one organic templating agent present in the intracrystalline pore system;

"m" represents the molar amount of "R" present per mole of $(EL_wAl_xP_ySi_z)O_2$ and has a value of from zero to about 0.3; "EL" represents at least one element capable of forming a three dimensional oxide framework, "EL" is characterized as an element having a mean "T—O" distance in tetrahedral oxide structures between about 1.51 Angstroms and about 2.06 Angstroms, "EL" has a cation electronegativity between about 125 kcal/g-atom to about 310 kcal/gm-atom and "EL" is capable of forming stable M—O—P, M—O—Al or M—O—M bonds in crystalline three dimensional oxide structures having a "M—O" bond dissociation energy greater than about 59 kcal/g-atom at 298° K.; and "w", "x", "y" and "z" represent the mole fractions of "EL", aluminum, phosphorus and silicon, respectively, present as framework oxides said mole fractions being within the pentagonal compositional area defined by points A, B, C, D and E of FIG. 1. where A, B, C, D and E are:

| Point | Mole Fraction | | |
|---|---|---|---|
| | x | y | (z + w) |
| A | 0.60 | 0.39-(0.01)p | 0.01(p + 1) |
| B | 0.39-(0.01p) | 0.60 | 0.01(p + 1) |
| C | 0.01 | 0.60 | 0.39 |
| D | 0.01 | 0.01 | 0.98 |
| E | 0.60 | 0.01 | 0.39 | where "p" is an integer corresponding to the number of elements "El" in the $(El_wAl_xP_ySi_z)O_2$ constituent.

The "ELAPSO" molecular sieves are also described as crystalline molecular sieves having three-dimensional microporous framework structures of $ELO_2$, $AlO_2$, $SiO_2$ and $PO_2$ tetrahedral oxide units and having an empirical chemical composition on an anhydrous basis expressed by the formula:

$$mR:(EL_wAl_xP_ySi_z)O_2$$

wherein

"R" represents at least one organic templating agent present in the intracrystalline pore system;

"m" represents the molar amount of "R" present per mole of $(EL_wAl_xP_ySi_z)O_2$ and has a value of from zero to about 0.3; "EL" represents at least one element capable of forming a framework tetrahedral oxide and is selected from the group consisting of arsenic, beryllium, boron, chromium, cobalt, gallium, germanium, iron, lithium, magnesium, manganese, titanium, vanadium and zinc; and "w", "x", "y" and "z" represent the mole fractions of "EL", aluminum, phosphorus and silicon, respectively, present as tetrahedral oxides said mole fractions being within the tetragonal compositional area defined by points a, b, c and d of FIG. 1 where a, b, c and d are:

| Point | Mole Fraction | | |
|---|---|---|---|
| | x | y | (z + w) |
| a | 0.60 | 0.39-(0.01)p | 0.01(p + 1) |
| b | 0.39-(0.01p) | 0.60 | 0.01(p + 1) |
| c | 0.10 | 0.55 | 0.35 |
| d | 0.55 | 0.10 | 0.35 | where "p" is as above defined.

The "ELAPSO" molecular sieves include numerous species which are intended herein to be within the scope of the term "non-zeolitic molecular sieves" such being disclosed in the following copending and commonly assigned applications, incorporated herein by reference thereto:

| U.S. Ser. No. | Filed | NZ-MS | U.S. Pat. No. |
|---|---|---|---|
| 600,174 | April 13, 1984 | CoAPSO | 4,744,970 |
| 600,173 | April 13, 1984 | FeAPSO | 4,683,217 |
| 600,180 | April 13, 1984 | MgAPSO | Abandoned |
| 600,175 | April 13, 1984 | MnAPSO | 4,686,092 |
| 600,179 | April 13, 1984 | TiAPSO | 4,684,617 |
| 600,170 | April 13, 1984 | ZnAPSO | |
| 600,168 | April 13, 1984 | CoMgAPSO | Abandoned |
| 600,182 | April 13, 1984 | CoMnMgAPSO | Abandoned |

TiAPSO Molecular Sieves

The TiAPSO molecular sieves of U.S. Ser. No. 600,179, filed Apr. 13, 1984 now U.S. Pat. No. 4,684,617 have three-dimensional microporous framework structures of $TiO_2$, $AlO_2$, $PO_2$ and $SiO_2$ tetrahedral oxide units having an empirical chemical composition on an anhydrous basis expressed by the formula:

$$mR:(Ti_wAl_xP_ySi_z)O_2$$

wherein

"R" represents at least one organic templating agent present in the intracrystalline pore system;

"m" represents the molar amount of "R" present per mole of $(Ti_wAl_xP_ySi_z)O_2$ and has a value of from zero to about 0.3; and "w", "x", "y" and "z" represent the mole fractions of titanium, aluminum, phosphorus and silicon, respectively, present as tetrahedral oxides and each has a value of at least 0.01. The mole fractions "w", "x", "y" and "z" are generally defined being within the pentagonal compositional area defined by points A, B, C, D and E of the ternary diagram of FIG. 1. Points A, B, C, D and E of FIG. 1 have the following values for "w", "x", "y", and "z":

| Point | Mole Fraction | | |
|---|---|---|---|
| | x | y | (z + w) |
| A | 0.60 | 0.38 | 0.02 |
| B | 0.38 | 0.60 | 0.02 |
| C | 0.01 | 0.60 | 0.39 |
| D | 0.01 | 0.01 | 0.98 |
| E | 0.60 | 0.01 | 0.39 |

Figure 2:
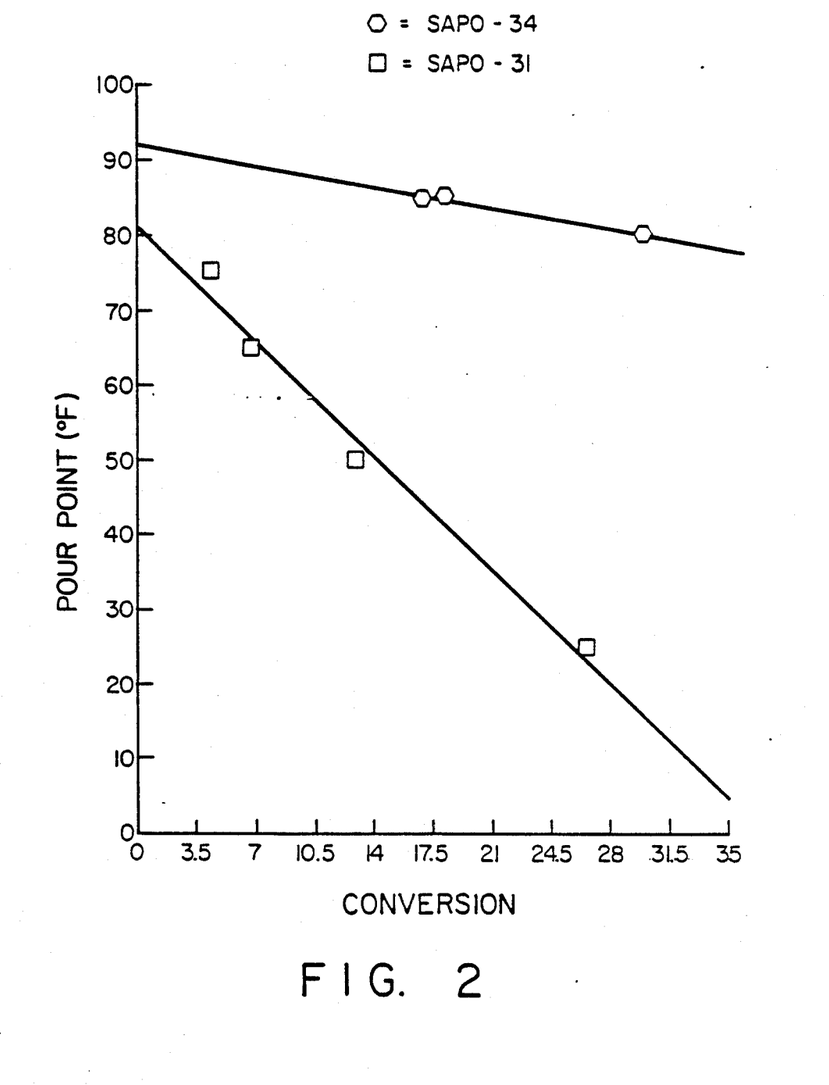
FIG. 2 is a plot of the pour point (°F.) as a function of conversion of Catalyst B (SAPO-31) and comparative Catalyst C (SAPO-34).

In a preferred subclass of TiAPSO molecular sieves the values "w", "x", "y" and "z" in the above formula are within the tetragonal compositional area defined by points a, b, c and d of the ternary diagram which is FIG. 2 of the drawings, said points a, b, c and d representing the following values for "w", "x", "y" and "z".

| Point | Mole Fraction | | |
|---|---|---|---|
| | x | y | (z + w) |
| a | 0.55 | 0.43 | 0.02 |
| b | 0.43 | 0.55 | 0.02 |
| c | 0.10 | 0.55 | 0.35 |
| d | 0.55 | 0.10 | 0.35 |

TiAPSO compositions are generally synthesized by hydrothermal crystallization from a reaction mixture containing active resources of titanium, silicon, aluminum and phosphorus, and preferably an organic templating, i.e., structure-directing, agent, preferably a compound of an element or Group VA of the Periodic Table, and/or optionally an alkali or metal metal. The reaction mixture is generally placed in a sealed pressure vessel, preferably lined with an inert plastic material such as polytetrafluoroethylene and heated, preferably under autogeneous pressure at a temperature between 50° C. and 250° C., and preferably between 100° C. and 200° C. until crystals of the TiAPSO product are obtained, usually a period of from hours to several weeks. Generally, the crystallization time is from about 2 hours to about 30 days and typically from about 4 hours to about 20 days. The product is recovered by any convenient method such as centrifugation or filtration.

In synthesizing the TiAPSO, it is preferred to employ a reaction mixture composition expressed in terms of the molar ratios as follows:

$$aR:(Zn_wAl_xP_ySi_z)O_2:bH_2O$$

wherein
"R" is an organic templating agent;
"a" is the amount of organic templating agent "R" and has a value of from zero to about 6 and is preferably an effective amount within the range of greater than zero (0) to about 6; "b" has a value of from zero (0) to about 500, preferably between about 2 and about 300; and "w", "x", "y" and "z" represent the mole fractions of titanium, aluminum, phosphorus and silicon, respectively, and each has a value of at least 0.01.

In a preferred embodiment the reaction mixture is selected such that the mole fractions "w", "x", "y" and "z" are generally defined as being within the pentagonal compositional area defined by points E, F, G, H and I of the ternary diagram of FIG. 3. Points E, F, G, H and I of FIG. 3 have the following values for "w", "x", "y" and "z";

| Point | Mole Fraction | | |
|---|---|---|---|
| | x | y | (z + w) |
| F | 0.60 | 0.38 | 0.02 |
| G | 0.38 | 0.60 | 0.02 |
| H | 0.01 | 0.60 | 0.39 |
| I | 0.01 | 0.01 | 0.98 |
| J | 0.60 | 0.01 | 0.39 |

In the foregoing expression of the reaction composition, the reactants are normalized with respect to the total of "w", "x", "y" and "z" such that $(w+x+y+z)=1.00$ mole.

MgAPSO Molecular Sieves

The MgAPSO molecular sieves of U.S. Ser. No. 600,180, filed Apr. 13, 1984 now U.S. Pat. No. 4,758,419, have three-dimensional microporous framework structures of $MgO_2^{-2}$, $AlO_2^{-}$, $PO_2^{+}$ and $SiO_2$ tetrahedral oxide units and have an empirical chemical composition on an anhydrous basis expressed by the formula:

$$mR:(Mg_wAl_xP_ySi_z)O_2$$

wherein
"R" represents at least one organic templating agent present in the intracrystalline pore system;
"m" represents the molar amount of "R" present per mole of $(Mg_wAl_xP_ySi_z)O_2$ and has a value from zero (0) to about 0.3; and "w", "x", "y" and "z" represent the mole fractions of magnesium, aluminum, phosphorus and silicon, respectively, present as tetrahedral oxides and each preferably has a value of at least 0.01. The mole fractions "w", "x", "y" and "z" are generally defined as being within the pentagonal compositional area defined by points A, B, C, D and E of the ternary diagram of FIG. 1. Points A, B, C, D and E of FIG. 1 have the following values for "w", "x", "y" and "z":

| Point | Mole Fraction | | |
|---|---|---|---|
| | x | y | (z + w) |
| A | 0.60 | 0.38 | 0.02 |
| B | 0.39 | 0.59 | 0.02 |
| C | 0.01 | 0.60 | 0.39 |
| D | 0.01 | 0.01 | 0.98 |
| E | 0.60 | 0.01 | 0.39 |

In a preferred subclass of the MgAPSO molecular sieves the values "w", "x", "y" and "z" in the above formula are within the tetragonal compositional area defined by the points a, b, c and d of the ternary diagram of FIG. 2, said points a, b, c and d representing the following values for "w", "x", "y" and "z":

| Point | Mole Fraction | | |
|---|---|---|---|
| | x | y | (z + w) |
| a | 0.55 | 0.43 | 0.02 |
| b | 0.43 | 0.55 | 0.02 |
| c | 0.10 | 0.55 | 0.35 |
| d | 0.55 | 0.10 | 0.35 |

MgAPSO compositions are generally synthesized by hydrothermal crystallization for an effective time at effective pressures and temperatures from a reaction mixture containing reactive sources of magnesium, silicon, aluminum and phosphorus, an organic templating, i.e., structure-directing, agent, preferably a compound of an element or Group VA of the Periodic Table, and may be an alkali or other metal. The reaction mixture is generally placed in a sealed pressure vessel, preferably lined with an inert plastic material such as polytetrafluoroethylene and heated, preferably under autogeneous pressure at a temperature between 50° C. and 250° C., and preferably between 100° C. and 200° C. until crystals of the MgAPSO product are obtained, usually a period of from several hours to several weeks. Generally, the crystallization period will be from about 2 hours to about 30 days with it typically being from about 4 hours to about 20 days for obtaining MgAPSO crystals. The product is recovered by any convenient method such as centrifugation or filtration.

In synthesizing the MgAPSO compositions, it is preferred to employ reaction mixture compositions expressed in terms of the molar ratios as follows:

$$aR:(Mg_wAl_xP_ySi_z)O_2:bH_2O$$

wherein

"R" is an organic templating agent;

"a" is the amount of organic templating agent "R" and can have a value within the range of from zero (0) to about 6 and is more preferably an effective amount greater than zero to about 6; "b" has a value of from zero (0) to about 500, preferably between about 2 and about 300; and "w", "x", "y" and "z" represent the mole fractions of magnesium, aluminum, phosphorus and silicon, respectively, and each has a value of at least 0.01.

In a preferred embodiment the reaction mixture is selected such that the mole fractions "w", "x", "y" and "z" are generally defined as being within the pentagonal compositional area defined by points F, G, H, I and J of the ternary diagram of FIG. 3. Points F, G, H, I and J of FIG. 3 have the following values for "w", "x", "y" and "z".

| Point | Mole Fraction | | |
|---|---|---|---|
| | x | y | (z + w) |
| F | 0.60 | 0.38 | 0.02 |
| G | 0.38 | 0.60 | 0.02 |
| H | 0.01 | 0.60 | 0.39 |
| I | 0.01 | 0.01 | 0.98 |
| J | 0.60 | 0.01 | 0.39 |

In the foregoing expression of the reaction composition, the reactants are normalized with respect to the total of "w", "x", "y" and "z" such that $(w+x+y+z)=1.00$ mole.

MnAPSO Molecular Sieves

The MnAPSO molecular sieves of U.S. Ser. No. 600,175, filed Apr. 13, 1984 now U.S. Pat. No. 4,686,092 have a framework structure of $MnO_2^{-2}$, $AlO_2^-$, $PO_2^+$, and $SiO_2$ tetrahedral units having an empirical chemical composition on an anhydrous basis expressed by the formula:

$$mR:(Mn_wAl_xP_ySi_z)O_2$$

wherein

"R" represents at least one organic templating agent present in the intracrystalline pore system;

"m" represents the molar amount of "R" present per mole of $(Mn_wAl_xP_ySi_z)O_2$ and has a value of zero to about 0.3; and "w", "x", "y" and "z" represent the mole fractions of element manganese, aluminum, phosphorus and silicon, respectively, present as tetrahedral oxides. The mole fractions "w", "x", "y" and "z" are generally defined as being within the pentagonal compositional area defined by points A, B, C, D and E of the ternary diagram of FIG. 1 and more preferably are generally defined as being within the tetragonal compositional area defined by points a, b, c and d of the ternary diagram of FIG. 2. Points A, B, C, D and E of FIG. 1 have the following values for "w", "x", "y", and "z":

| Point | Mole Fraction | | |
|---|---|---|---|
| | x | y | (w + z) |
| A | 0.60 | 0.38 | 0.02 |
| B | 0.38 | 0.60 | 0.02 |
| C | 0.01 | 0.60 | 0.39 |
| D | 0.01 | 0.01 | 0.98 |
| E | 0.60 | 0.01 | 0.39 |
| W | | | |

Points a, b, c, and d of FIG. 2 have the following values for "w", "x", "y", and "z":

| Point | Mole Fraction | | |
|---|---|---|---|
| | x | y | (w + z) |
| a | 0.55 | 0.43 | 0.02 |
| b | 0.43 | 0.55 | 0.02 |
| c | 0.10 | 0.55 | 0.35 |
| d | 0.55 | 0.10 | -0.35 |

The MnAPSOs of this invention are useful as adsorbents, catalysts, ion-exchangers, and the like in much the same fashion as aluminosilicates have been employed heretofore, although their chemical and physical properties are not necessaily similar to those observed for aluminosilicates.

MnAPSO compositions are generally synthesized by hydrothermal crystallization from a reaction mixture containing reactive sources of manganese, silicon, aluminum and phosphorus, preferably an organic templating, i.e., structure-directing, agent, preferably a compound of an element or Group VA of the Periodic Table, and/or optionally an alkali or other metal. The reaction mixture is generally placed in a sealed pressure vessel, preferably lined with an inert plastic material such as polytetrafluoroethylene and heated, preferably under autogeneous pressure at a temperature between about 50° C. and about 250° C., and preferably between about 100° C. and about 200° C. until crystals of the MnAPSO product are obtained, usually a period of from several hours to several weeks. Typical effective times of from 2 hours to about 30 days with generally from about 4 hours to about 20 days have been observed. The product is recovered by any convenient method such as centrifugation or filtration.

In synthesizing the MnAPSO compositions, it is preferred to employ a reaction mixture composition expressed in terms of the molar ratios as follows:

$$aR:(Mn_wAl_xP_ySi_z)O_2:bH_2O$$

wherein

"R" is an organic templating agent;

"a" is the amount of organic templating agent "R" and has a value of from zero to about 6 and is preferably an effective amount within the range of greater than zero (0) to about 6; "b" has a value of from zero (0) to about 500, preferably between about 2 and about 300; and "w", "x", "y" and "z" represent the mole fractions of manganese, aluminum, phosphorus and silicon, respectively, and each has a value of at least 0.01.

In a preferred embodiment the reaction mixture is selected such that the mole fractions "w", "x", "y" and "z" are generally defined as being within the pentagonal compositional area defined by points E, F, G, H and I of the ternary diagram of FIG. 3. Points E, F, G, H and I of FIG. 3 have the following values for "w", "x", "y" and "z":

| Point | Mole Fraction | | |
|---|---|---|---|
| | x | y | (w + z) |
| F | 0.60 | 0.38 | 0.02 |
| G | 0.38 | 0.60 | 0.02 |
| H | 0.01 | 0.60 | 0.39 |
| I | 0.01 | 0.01 | 0.98 |
| J | 0.60 | 0.01 | 0.39 |

In the foregoing expression of the reaction composition, the reactants are normalized with respect to the total of "w", "x", "y" and "z" such that $(w+x+y+z)=1.00$ mole.

CoAPSO Molecular Sieves

The CoAPSO molecular sieves of U.S. Ser. No. 600,174, filed Apr. 13, 1984 now U.S. Pat. No. 4,744,970 have three-dimensional microporous framework structures of $CoO_2^{-2}$, $AlO_2^-$, $PO_2^+$ and $SiO_2$ tetrahedral units and have an empirical chemical composition on an anhydrous basis expressed by the formula:

$$mR:(Co_wAl_xP_ySi_z)O_2$$

wherein

Figure 1:
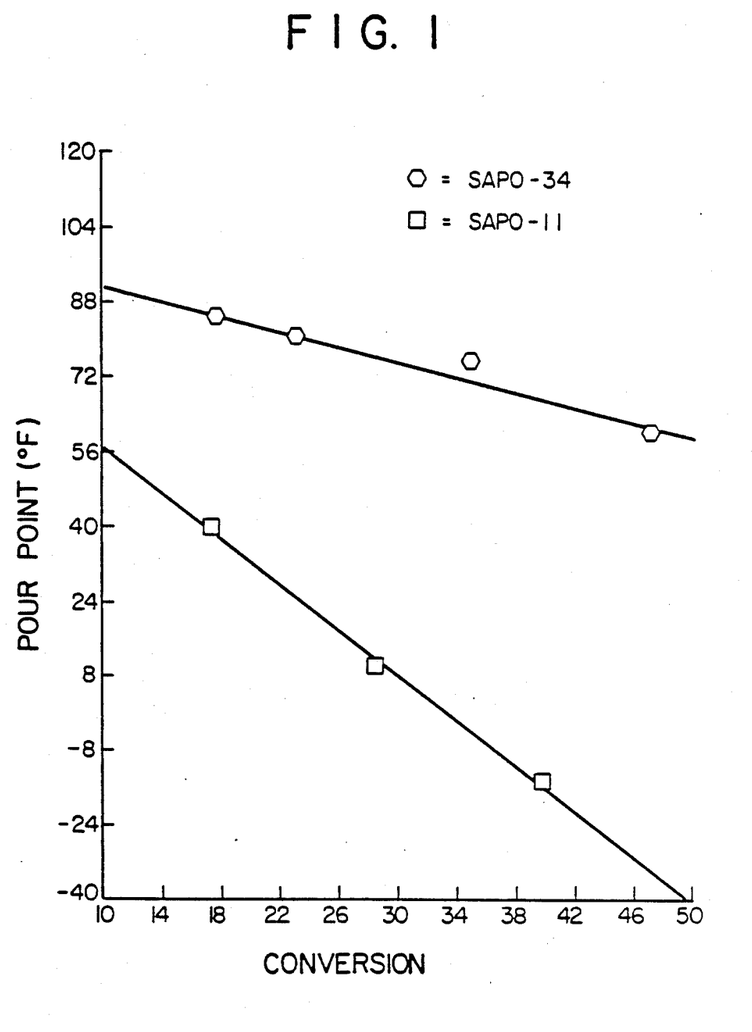
FIG. 1 is a plot of the pour point (°F.) as a function of conversion of Catalyst A (SAPO-11) and comparative Catalyst C (SAPO-34).

"R" represents at least one organic templating agent present in the intracrystalline pore system;

"m" represents the molar amount of "R" present per mole of $(Co_wAl_xP_ySi_z)O_2$ and has a value of from zero to about 0.3; and "w", "x", "y" and "z" represent the mole fractions of cobalt, aluminum, phosphorus and silicon, respectively, present as tetrahedral oxides, where the mole fractions "w", "x", "y" and "z" are each at least 0.01 and are generally defined, as being within the pentagonal compositional area defined by points A, B, C, D and E of FIG. 1, said points A, B, C, D, and E having the following values for "w", "x", "y" and "z":

| Point | Mole Fraction | | |
|---|---|---|---|
| | x | y | (z + w) |
| A | 0.60 | 0.38 | 0.02 |
| B | 0.38 | 0.60 | 0.02 |
| C | 0.01 | 0.60 | 0.39 |
| D | 0.01 | 0.01 | 0.98 |
| E | 0.60 | 0.01 | 0.39 |

In a preferred subclass of the CoAPSO molecular sieves the values of "w", "x", "y", and "z" in the above formula are within the tetragonal compositional area defined by points a, b, c, and d, of FIG. 2, said points a, b, c, and d having the following values for "w", "x", "y" and "z":

| Point | Mole Fraction | | |
|---|---|---|---|
| | x | y | (z + w) |
| a | 0.55 | 0.43 | 0.02 |
| b | 0.43 | 0.55 | 0.02 |
| c | 0.10 | 0.55 | 0.35 |
| d | 0.55 | 0.10 | 0.35 |

CoAPSO compositions are generally synthesized by hydrothermal crystallization from a reaction mixture containing reactive sources of cobalt, silicon, aluminum and phosphorus, an organic templating, i.e., structure-directing, agent, preferably a compound of an element of Group VA of the Periodic Table, and optionally an alkali metal. The reaction mixture is generally placed in a sealed pressure vessel, preferably lined with an inert plastic material such as polytetrafluoroethylene and heated, preferably under autogeneous pressure at an effective temperature which is generally between 50° C. and 250° C. and preferably between 100° C. and 200° C. until crystals of the CoAPSO product are obtained, usually for an effective time of from several hours to several weeks. Generally the effective crystallization time will be from about 2 hours to about 30 days and typically from about 4 hours to about 20 days. The product is recovered by any convenient method such as centrifugation or filtration.

In synthesizing the CoAPSO, it is preferred to employ a reaction mixture composition expressed in terms of the molar ratios as follows:

$$aR:(Co_wAl_xP_ySi_z)O_2:bH_2O$$

wherein

"R" is an organic templating agent;

"a" is the amount of organic templating agent "R" and has a value of from zero to about 6 and is preferably an effective amount within the range of greater than zero (0) to about 6; "b" has a value of from zero (0) to about 500, preferably between about 2 and 300; and "w", "x", "y" and "z" represent the mole fractions of cobalt, aluminum, phosphorus and silicon, respectiely, and each has a value of at least 0.01. In a preferred embodiment the reaction mixture is selected such that the mole fractions "w", "x", "y" and "z" are generally defined as being within the pentagonal compositional area defined by points E, F, G, H and I of the ternary diagram of FIG. 3. Points E, F, G, H and I of FIG. 3 have the following values for "w", "x", "y" and "z":

| Point | Mole Fraction | | |
|---|---|---|---|
| | x | y | (z + w) |
| F | 0.60 | 0.38 | 0.02 |
| G | 0.38 | 0.60 | 0.02 |
| H | 0.01 | 0.60 | 0.39 |
| I | 0.01 | 0.01 | 0.98 |
| J | 0.60 | 0.01 | 0.39 |

For reasons unknown at present, not every reaction mixture gave crystalline CoAPSO products when reaction products were examined for CoAPSO products by X-ray analysis. Those reaction mixtures from which crystalline CoAPSO products were obtained are reported in the examples hereinafter as numbered examples and those reaction mixtures from which CoAPSO products were not identified by use of X-ray analysis are reported as lettered examples.

In the foregoing expression of the reaction composition, the reactants are normalized with respect to the total of "w", "x", "y" and "z" such that $(w+x+y+z)=1.00$ mole.

ZnAPSO Molecular Sieves

The ZnAPSO molecular sieves of U.S. Ser. No. 600,170, filed Apr. 13, 1984 comprise framework structures of $ZnO_2^{-2}$, $AlO_2^-$, $PO_2^+$ and $SiO_2$ tetrahedral units having an empirical chemical composition on an anhydrous basis expressed by the formula:

$$mR:(Zn_wAl_xP_ySi_z)O_2$$

wherein

"R" represents at least one organic templating agent present in the intracrystalline pore system;

"m" represents the molar amount of "R" present per mole of $(Zn_wAl_xP_ySi_z)O_2$ and has a value of zero to about 0.3; and "w", "x", "y" and "z" represent the mole fractions of zinc, aluminum, phosphorus and silicon, respectively, present as tetrahedral oxides and each has a value of at least 0.01. The mole fractions "w", "x", "y" and "z" are generally defined being within the pentagonal compositional area defined by points A, B, C, D and E of the ternary diagram of FIG. 1. Points A, B, C, D and E of FIG. 1 have the following values for "w", "x", "y", and "z":

| Point | Mole Fraction | | |
|---|---|---|---|
| | x | y | (z + w) |
| A | 0.60 | 0.38 | 0.02 |
| B | 0.38 | 0.60 | 0.02 |
| C | 0.01 | 0.60 | 0.39 |
| D | 0.01 | 0.01 | 0.98 |
| E | 0.60 | 0.01 | 0.39 |

In a preferred subclass of ZnAPSO molecular sieves the values "w", "x", "y" and "z" in the above formula are within the tetragonal compositional area defined by points a, b, c and d of the ternary diagram which is FIG. 2 of the drawings, said points a, b, c and d representing the following values for "w", "x", "y" and "z".

| Point | Mole Fraction | | |
|---|---|---|---|
| | x | y | (z + w) |
| a | 0.55 | 0.43 | 0.02 |
| b | 0.43 | 0.55 | 0.02 |
| c | 0.10 | 0.55 | 0.35 |
| d | 0.55 | 0.10 | 0.35 |

ZnAPSO compositions are generally synthesized by hydrothermal crystallization at effective process conditions from a reaction mixture containing active sources of zinc, silicon, aluminum and phosphorus, preferably an organic templating, i.e., structure-directing, agent, preferably a compound of an element or Group VA of the Periodic Table, and/or optionally an alkali or other metal. The reaction mixture is generally placed in a sealed pressure vessel, preferably lined with an inert plastic material such as polytetrafluoroethylene and heated, preferably under autogeneous pressure at a temperature between 50° C. and 250° C., and preferably between 100° C. and 200° C. until crystals of the ZnAPSO product are obtained, usually a period of from several hours to several weeks. Generally the effective crystallization period is from about 2 hours to about 30 days with typical periods of from about 4 hours to about 20 days being employed to obtain ZnAPSO products. The product is recovered by any convenient method such as centrifugation or filtration.

In synthesizing the ZnAPSO compositions, it is preferred to employ a reaction mixture composition expressed in terms of the molar ratios as follows:

$$aR:(Zn_wAl_xP_ySi_z)O_2:bH_2O$$

wherein

"R" is an organic templating agent;

"a" is the amount of organic templating agent "R" and has a value of from zero to about 6 and is preferably an effective amount within the range of greater than zero (0) to about 6; "b" has a value of from zero (0) to about 500, more preferably between about 2 and about 300; and "w", "x", "y" and "z" represent the mole fractions of zinc, aluminum, phosphorus and silicon, respectively, and each has a value of at least 0.01. In a preferred embodiment the reaction mixture is selected such that the mole fractions "w", "x", "y" and "z" are generally defined as being within the pentagonal compositional area defined by points F, G, H, I and J of the ternary diagram of FIG. 3. Points F, G, H, I and J of FIG. 3 have the following values for "w", "x", "y" and "z":

| Point | Mole Fraction | | |
|---|---|---|---|
| | x | y | (z + w) |
| F | 0.60 | 0.38 | 0.02 |
| G | 0.38 | 0.60 | 0.02 |
| H | 0.01 | 0.60 | 0.39 |
| I | 0.01 | 0.01 | 0.98 |
| J | 0.60 | 0.01 | 0.39 |

In the foregoing expression of the reaction composition, the reactants are normalized with respect to the total of "w", "x", "y" and "z" such that $(w+x+y+z)=1.00$ mole.

FeAPSO Molecular Sieves

The FeAPSO of U.S. Ser. No. 600,173, filed Apr. 13, 1984 now U.S. Pat. No. 4,683,217 have molecular sieves having a three-dimensional microporous crystal framework structures of $FeO_2^{-2}$, (and/or $FeO_2^-$), $AlO_2^-$, $PO_2^+$ and $SiO_2$ tetrahedral oxide units and having a unit empirical formula, on an anhydrous basis, of:

$$mR:(Fe_wAl_xP_ySi_z)O_2 \qquad (1)$$

wherein

"R" represents at least one organic templating agent present in the intracrystalline pore system;

"m" represents the moles of "R" present per mole of $(Fe_wAl_xP_ySi_z)O_2$ and has a value of from zero (0) to about 0.3; the maximum value of "m" in each case depends upon the molecular dimensions of the templating agent and the available void volume of the pore system of the particular molecular sieve involved; and "w", "x", "y" and "z" represent the mole fractions of iron, aluminum, phosphorus and silicon, respectively, present as tetrahedral oxides, said mole fractions being such that they are within the pentagonal compositional area defined by points A, B, C, D and E of the ternary diagram which is FIG. 1 of the drawings and more preferably are within the tetragonal compositional area defined by points a, b, c, and d of the ternary diagram which is FIG. 2 of the drawings. Points A, B, C, D and E of FIG. 1 represent the following values for "w", "x", "y" and "z":

| Point | Mole Fraction | | |
|---|---|---|---|
| | x | y | (z + w) |
| A | 0.60 | 0.38 | 0.02 |
| B | 0.38 | 0.60 | 0.02 |
| C | 0.01 | 0.60 | 0.39 |

| Point | Mole Fraction | | |
|---|---|---|---|
| | x | y | (z + w) |
| D | 0.01 | 0.01 | 0.98 |
| E | 0.60 | 0.01 | 0.39 |

Points a, b, c and d of FIG. 2 represent the following values for "w", "x", "y" and "z":

| Point | Mole Fraction | | |
|---|---|---|---|
| | x | y | (z + w) |
| a | 0.55 | 0.43 | 0.02 |
| b | 0.43 | 0.55 | 0.02 |
| c | 0.10 | 0.55 | 0.35 |
| d | 0.55 | 0.10 | 0.35 |

The FeAPSOs of the instant invention are generally synthesized by hydrothermal crystallization from a reaction mixture comprising reactive sources of iron, aluminum, phosphorus and silicon, and preferably one or more organic templating agents. Optionally, alkali or other metal(s) may be present in the reaction mixture and may act as templating agents. The reaction mixture is generally placed in a pressure vessel, preferably lined with an inert plastic material, such as polytetrafluoroethylene, and heated, preferably under the autogeneous pressure, at an effective temperature which is generally between about 50° C., and about 250° C. and preferably between about 100° C. and 200° C. until crystals of the FeAPSO product are obtained, usually a period of from several hours to several weeks.

CoMnAPSO Molecular Sieves

The expressed by the empirical chemical formula (anhydrous):

$$mR:(Co_uMn_vAl_xP_ySi_z)O_2$$

where "u", "v", "x", "y" and "z" represent the mole. The CoMnAPSO molecular sieves have an empirical chemical composition on an anhydrous basis expressed by the formula:

$$mR:(Co_uMn_vAl_xP_ySi_z)O_2$$

wherein
"R" represents at least one organic templating agent present in the intracrystalline pore system;
"m" represents the molar amount of "R" present per mole of $(Co_uMn_vAl_xP_ySi_z)O_2$ from zero (0) to about 0.3; and "u", "v", "x", "y" and "z" represent the mole fractions of cobalt, manganese, aluminum, phosphorus and silicon, respectively, present as tetrahedral oxides. The mole fractions "u", "v", "x", "y", and "z" are generally defined as being within the pentagonal compositional area defined by points A, B, C, D and E of FIG. 1, where "w" is the sum of "u" and "v" and where "$M_w$" in FIG. 1 represents the combined mole fractions of cobalt and manganese:

| Point | Mole Fraction | | |
|---|---|---|---|
| | x | y | (z + w) |
| A | 0.60 | 0.37 | 0.03 |
| B | 0.37 | 0.60 | 0.03 |
| C | 0.01 | 0.60 | 0.39 |
| D | 0.01 | 0.01 | 0.98 |

| Point | Mole Fraction | | |
|---|---|---|---|
| | x | y | (z + w) |
| E | 0.60 | 0.01 | 0.39 |

The mole fractions u, v, x, y and z, expressed as in FIG. 1, are preferably defined as being within the tetragonal compositional area defined by points a, b, c and d of FIG. 2 as follows:

| | Mole Fraction | | |
|---|---|---|---|
| | x | y | (z + w) |
| a | 0.55 | 0.42 | 0.03 |
| b | 0.42 | 0.55 | 0.03 |
| c | 0.10 | 0.55 | 0.35 |
| d | 0.55 | 0.10 | 0.35 |

CoMnAPSO compositions are generally synthesized by hydrothermal crystallization from a reaction mixture containing reactive sources of cobalt, manganese, aluminum, phosphorus and silicon and preferably an organic templating agent, i.e., structure-directing, agent. The structure-directing agents are preferably a compound of an element of Group VA of the Periodic Table, and may be an alkali or other metal. The reaction mixture is generally placed in a sealed pressure vessel, preferably lined with an inert plastic material such as polytetra-fluoroethylene and heated, preferably under autogeneous pressure and at typical effective temperatures between 50° C. and 250° C., preferably between 100° C. and 200° C., until crystals of the CoMnAPSO product are obtained, usually over a period of from several hours to several weeks. Typical effective crystallization times are form about 2 hours to 30 days with from about 4 hours to about 20 days being generally employed to obtain CoMnAPSO products. The product is recovered by any convenient method such as centrifugation or filtration.

In synthesizing the CoMnAPSO compositions, it is preferred to employ a reaction mixture composition expressed in terms of the molar ratios as follows:

$$aR:(Co_uMn_vAl_xP_ySi_z)O_2:bH_2O$$

wherein
"R" is an organic templating agent;
"a" is the amount of organic templating agent "R" and has a value of from zero to about 6 and is preferably an effective amount within the range of greater than zero (0) to about 6; "b" has a value of from zero (0) to about 500, preferably between about 2 and about 300; and "u", "v", "x", "y", and "z" represent the mole fractions of elements cobalt, manganese, aluminum, phosphorus and silicon, respectively, and each has a value of at least 0.01.

In a preferred embodiment the reaction mixture is selected such that the mole fractions "w", "x", "y" and "z" are generally defined as being within the pentagonal compositional area defined by points E, F, G, H and I of the ternary diagram of FIG. 3. Points E, F, G, H, and I of FIG. 3 have the following values for "w", "x", "y" and "z":

| | Mole Fraction | | |
|---|---|---|---|
| | x | y | (z + w) |
| F | 0.60 | 0.37 | 0.03 |
| G | 0.37 | 0.60 | 0.03 |
| H | 0.01 | 0.60 | 0.39 |
| I | 0.01 | 0.01 | 0.98 |
| J | 0.60 | 0.01 | 0.39 |

In the foregoing expression of the reaction composition, the reactants are normalized with respect to the total of "u", "v", "x", "y" and "z" such that $(u+v+x+y+z)=1.00$ mole.

CoMnMgAPSO Molecular Sieves

The CoMnMgAPSO molecular sieves of U.S. Ser. No. 600,182, filed Apr. 13, 1984 (now abandoned) have three-dimensional microporous framework structures of $CoO_2^{-2}$, $MnO_2^{-2}$, $MgO_2^{-2}$, $AlO_2^{-}$, $PO_2^{+}$ and $SiO_2$ tetrahedral oxide units and have an empirical chemical composition on an anhydrous basis expressed by the formula:

$$mR:(Co_tMn_uMg_vAl_xP_ySi_z)O_2$$

wherein

"R" represents at least one organic templating agent present in the intracrystalline pore system;

"m" represents the molar amount of "R" present per mole of $(Co_tMn_uMg_vAl_xP_ySi_z)O_2$, and has a value of from zero to about 0.3; and "t", "u", "v", "x", "y" and "z" represent the mole fractions of cobalt, manganese, magnesium, aluminum, phosphorus and silicon, respectively, present as tetrahedral oxides, each having a value of at least 0.01. The mole fractions "t", "u", "v", "x", "y" and "z" are generally defined as being within the pentagonal compositional area defined by points A, B, C, D and E of FIG. 1 where "M" denotes cobalt, manganese and magnesium and "w" denotes the combined mole fractions of "t", "u" and "v", such that "w"="t"+"u"+"v" and such that "t", "u" "v" and "z" each have a value of at least 0.01. Points A, B, C, D and E of FIG. 1 have the following values for "w", "x", "y" and "z":

| | Mole Fraction | | |
|---|---|---|---|
| Point | x | y | (z + w) |
| A | 0.60 | 0.36 | 0.04 |
| B | 0.36 | 0.60 | 0.04 |
| C | 0.01 | 0.60 | 0.39 |
| D | 0.01 | 0.01 | 0.98 |
| E | 0.60 | 0.01 | 0.39 |

In a preferred subclass of the CoMnMgAPSO molecular sieves the values of "w", "x", "y" and "z" in the above formula are within the tetragonal compositional area defined by points a, b, c and d of FIG. 2. Points a, b, c and d have the following values for "w", "x", "y" and "z":

| | Mole Fraction | | |
|---|---|---|---|
| Point | x | y | (z + w) |
| a | 0.55 | 0.41 | 0.04 |
| b | 0.41 | 0.55 | 0.04 |
| c | 0.10 | 0.55 | 0.35 |

-continued

| | Mole Fraction | | |
|---|---|---|---|
| Point | x | y | (z + w) |
| d | 0.55 | 0.10 | 0.35 |

The CoMnMgAPSOs of this invention are useful as adsorbents, catalysts, ion-exchangers, and the like in much the same fashion as aluminosilicates have been employed heretofore, although their chemical and physical properties are not necessarily similar to those observed for aluminosilicates.

CoMnMgAPSO compositions are generally synthesized by hydrothermal crystallization from a reaction mixture containing reactive sources of cobalt, manganese, magnesium, aluminum, phosphorus and silicon, and preferably an organic templating agent, i.e., structure-directing, agent. The structure-directing agents are preferably a compound of an element of Group VA of the Periodic Table, and/or optionally an alkali or other metal. The reaction mixture is generally placed in a sealed pressure vessel, preferably lined with an inert plastic material such as polytetrafluoroethylene and heated, preferably under autogeneous pressure at a temperature between 50° C. and 250° C., and preferably between 100° C. and 200° C. until crystals of the CoMnMgAPSO product are obtained, usually over a period of from several hours to several weeks. Typical crystallization times are from about 2 hours to about 30 days with from about 4 hours to about 20 days generally being employed to obtain CoMnMgAPSO products. The product is recovered by any convenient method such as centrifugation or filtration.

In synthesizing the CoMnMgAPSO compositions, it is preferred to employ a reaction mixture composition expressed in terms of the molar ratios as follows:

$$aR:(Co_tMn_uMg_vAl_xP_ySi_z)O_2:bH_2O$$

wherein

"R" is an organic templating agent;

"a" is the amount of organic templating agent "R" and has a value of from zero to about 6 and is preferably an effective amount within the range of greater than zero (0) to about 6 and more preferably from greater than zero to about 2; "b" has a value of from zero (0) to about 500, preferably between about 2 and about 300; and "t", "u", "v", "x", "y", and "z" represent the mole fractions of cobalt, manganese, magnesium, aluminum, phosphorus and silicon, respectively, and each has a value of at least 0.01.

In a preferred embodiment the reaction mixture is selected such that the mole fractions "w", "x", "y" and "z", where "w" is the sum of "t"+"u"+"v", are generally defined as being within the pentagonal compositional area defined by points E, F, G, H and I of the ternary diagram of FIG. 3. Points E, F, G, H and I of FIG. 3 have the following values "w", "x", "y" and "z":

| | Mole Fraction | | |
|---|---|---|---|
| Point | x | y | (z + w) |
| F | 0.60 | 0.36 | 0.04 |
| G | 0.36 | 0.60 | 0.04 |
| H | 0.01 | 0.60 | 0.39 |
| I | 0.01 | 0.01 | 0.98 |

| | -continued | | |
|---|---|---|---|
| | | Mole Fraction | |
| Point | x | y | (z + w) |
| J | 0.60 | 0.01 | 0.39 |

In the foregoing expression of the reaction composition, the reactants are normalized with respect to the total of "t", "u", "v", "x", "y" and "z" such that $(t+u+v+x+y+z)=1.00$ mole.

SAPO Molecular Sieves

The silicoaluminophosphate molecular sieves of U.S. Pat. No. 4,440,871 are microporous crystalline silicoaluminophosphates the pores of which are uniform and have nominal diameters of greater than about 3 Angstroms and whose essential empirical chemical composition in the as-synthesized and anhydrous form is wherein "R" represents at least one organic templating agent present in the intracrystalline pore system;

"m" represents the moles of "R" present per mole of $(Si_xAl_yP_z)O_2$; "m" has a value of from 0.02 to 0.3; "x", "y" and "z" represent the mole fractions of silicon, aluminum and phosphorus respectively, present as tetrahedral oxides, said mole fractions being such that they are within the pentagonal compositional area defined by points ABCD and E of the ternary diagram which is FIG. 1 of the drawings of U.S. Pat. No. 4,440,871. The SAPO molecular sieves of U.S. Pat. No. 4,440,871 are also described as silicoaluminophosphates having a three-dimensional microporous framework structure of $PO_2^+$, $AlO_2^-$ and $SiO_2$ tetrahedral units, and whose essential empirical chemical composition on an anhydrous basis is:

wherein

"R" represents at least one organic templating agent present in the intracrystalline pore system;

"m" represents the moles of "R" present per mole of $(Si_xAl_yP_z)O_2$ and has a value of from zero to 0.3; "x", "y" and "z" represent respectively, the mole fractions of silicon, aluminum and phosphorus present in the oxide moiety, said mole fractions being within the compositional area bounded by points A, B, C, D and E on the ternary diagram which is FIG. 1, said silicoaluminophosphate having a characteristic X-ray powder diffraction pattern which contains at least the d-spacings set forth below in any one of Tables I, III, V, VII, IX, XII, XVII, XXI, XXIII or XXV of U.S. Pat. No. 4,440,871. Further, such crystalline silicoaluminophosphates may be calcined at a temperature sufficiently high to remove at least some of any organic templating agent present in the intracrystalline pore system. The silicoaluminophosphates of U.S. Pat. No. 4,440,871 are generally referred to therein as "SAPO-n", as a class, or as "SAPO-n" wherein "n" is an interger denoting a particular SAPO as its preparation is reported in U.S. Pat. No. 4,440,871.

NZ—MS CATALYSTS

The specific NZ—MSs employed in the instant invention are characterized in their calcined form by an adsorption of isobutane of at least 2 percent by weight at a partial pressure of 500 torr and a temperature of 20° C. The NZ—MS's are preferably also characterized in their calcined form by an adsorption of triethylamine of from zero to less than 5 percent by weight, preferably less than 3 weight percent, at a partial pressure of 2.6 torr and a temperature of 22° C.

The NZ—MSs employed herein are characterized by the aforementioned adsorption criteria. Certain NZ—MS species which may be employed herein are designated in one or more of the aforementioned classes of NZ—MS by an "—n" designation of −5, −11, −31, −33, −36, −37, −40 and −41 to the extent such meet the aforementioned adsorption criteria. NZ—MSs characterized by the above described adsorption of isobutane include, but are not limited to, ELAPSO-5, ELAPSO-11, ELAPSO-40, ELAPSO-41, CoAPSO-5, CoAPSO-11, CoAPSO-31, FeAPSO-5, FeAPSO-11, FeAPSO-31, MgAPSO-11, MgAPSO-31, MnAPSO-11, MnAPSO-31, TiAPSO-11, ZnAPSO-11, ZnAPSO-31, CoMgAPSO-11, CoMnMgAPSO-11, MeAPO-5, MeAPO-11, MeAPO-31, TiAPO-11, TiAPO-31, FeAPO-11, ELAPO-11, ELAPO-31, ELAPO-40, ELAPO-41 SAPO-11, SAPO-31, SAPO-37, SAPO-40, SAPO-41 and mixtures thereof.

The above characterization of the NZ—MSs employed in the instant invention relates to an adsorption characterization that is carried out on a NZ—MS which has been subjected to a post synthesis treatment, e.g., calcination or chemical treatment, to remove a substantial portion of the template "R" which is present as a result of synthesis. Although a particular NZ—MS is characterized herein by reference to its adsorption of isobutane or triethylamine as relating to the adsorption characteristics of the NZ—MS in its calcined form, the instant invention necessarily includes the use of a non-calcined or modified NZ—MSs which are characterized by such adsorption in the modified or calcined form, since upon use of such a non-calcined NZ—MS in the instant process at effective dewaxing conditions the NZ—MS will be calcined or hydrothermally treated in situ so as to have the characteristic adsorption of isobutane or triethylamine. Thus, the NZ—MS will be rendered in situ to a form characterized by the aforementioned adsorption characteristics. For example, an as-synthesized MgAPSO-11 or SAPO-11 are not characterized by the aforementioned adsorption of isobutane due to the presence of template "R" which is present as a result of synthesis, although the calcined form of MgAPSO-11 and SAPO-11 are characterized by the aforementioned adsorption of isobutane. Thus, reference to a NZ—MS having a particular adsorption characteristic in its calcined form is not intended to exclude the use of the NZ—MS in its as-synthesized form which upon in-situ calcination, hydrothermal treatment and/or other treatment, e.g., ion exchange with suitable atoms, would have such adsorption characteristics.

The NZ—MSs of the instant invention may be employed in conjunction with traditional dewaxing and/or hydrocracking catalysts and accordingly, optionally, a zeolitic aluminosilicate component may be employed in conjunction with the NZ—MS-containing catalysts. The zeolitic aluminosilicate component of such catalysts may be any aluminosilicate heretofore employed as a component in dewaxing catalysts. Representatives of the zeolitic aluminosilicates disclosed heretofore as employable as component parts of traditional dewaxing catalysts are Zeolite Y, steam stabilized Zeolite Y (ultra-stable Y), Zeolite X, Zeolite beta (U.S. Pat. No. 3,308,069), Silicalite (U.S. Pat. No. 4,061,724),, Zeolite KZ-20 (U.S. Pat. No. 3,445,727), Zeolite ZSM-3 (U.S. Pat. No. 3,415,736), faujasite, LZ-10 (U.K. Pat. No. 2,014,970, June 9, 1982), US-Y, ZSM-type zeolites, erionite, mordenite, offretite, chabazite, FU-1-type zeolite, NU-type zeolites and mixtures thereof. Traditional cracking catalysts containing amounts of $Na_2O$ less than about one percent by weight are generally preferred.

Zeolitie Y is disclosed in U.S. Pat. No.: 3,130,007; and steam stabilized Y Zeolites, e.g., ultra-stable Y-type zeolites.

Another zeolitic aluminosilicate employable herein is "LZ-210", is described in E.P.C. Publication No. 82,211 published June 29, 1983, incorporated herein by reference thereto. In one embodiment the LZ-210 containing hydrocracking catalysts disclosed in copending U.S. Ser. No. 490,951, filed May 2, 1983, incorporated herein by reference, may be employed as an optional component of the catalyst.

The term "ZSM-type" zeolites is generally employed in the art to refer to those zeolites denominated by the nomenclature "ZSM-n" where "n" is an integer. The ZSM-type aluminosilicates include but are not limited to ZSM-5, ZSM-11, ZSM-12, ZSM-23, ZSM-35, ZSM-38, ZSM-48; and other similar materials.

ZSM-5 is described in greater detail in U.S. Pat. No. 3,702,886 and Re 29,948. The entire descriptions contained within those patents, particularly the X-ray diffraction pattern of therein disclosed ZSM-5, are incorporated herein by reference.

ZSM-11 is described in U.S. Pat. No. 3,709,979. That description, and in particular the X-ray diffraction pattern of said ZSM-11, is incorporated herein by reference.

ZSM-12 is described in U.S. Pat. No. 3,832,449. That description, and in particular the X-ray diffraction pattern disclosed therein, is incorporated herein by reference.

ZSM-23 is described in U.S. Pat. No. 4,076,842. The entire content thereof, particularly the specification of the X-ray diffraction pattern of the disclosed zeolite, is incorporated herein by reference.

ZSM-35 is described in U.S. Pat. No. 4,016,245. The description of that zeolite, and particularly the X-ray diffraction pattern thereof, is incorporated herein by reference.

ZSM-38 is more particularly describing U.S. Pat. No. 4,046,859. The description of that zeolite, and particularly the specified X-ray diffraction pattern hereof, is incorporated herein by reference.

ZSM-48 is more particularly described in U.S. Pat. No. 4,423,021. The description of that zeolite, and particularly the specified X-ray diffraction pattern thereof, is incorporated herein by reference. In addition, crystalline silicates such as silicalite (U.S. Pat. No. 4,061,724) may be employed with the NZ—MSs of the instant invention.

FORMULATION OF NZ—MS DEWAXING CATALYSTS

The catalysts of the instant invention comprise at least one NZ—MS, as above characterized, and optionally, may also contain a hydrogenation catalyst and/or one or more traditional dewaxing catalysts and/or hydrocracking catalysts, including zeolitic aluminosilicate components. The relative amount of the NZ—MS component or traditional hydroprocessing component, if any, will depend at least in part, on the selected hydrocarbon feedstock and on the desired pour point of the product, but in all instances an effective amount of at least one NZ—MS is employed. When a zeolitic aluminosilicate is employed as a part of the traditional dewaxing component the relative weight ratio of the zeolitic aluminosilicate to the NZ—MS is generally between about 1:10 and about 500:1, desirably between about 1:10 and about 200:1, preferably between about 1:2 and about 50:1, and most preferably is between about 1:1 and about 20:1. The zeolitic aluminosilicate and NZ—MS may be ion-exchanged with a selected cation(s) and/or thermally treated either before or after mixture with each other or after such have been added separately or concurrently to one or more inorganic oxide matrix components. When the NZ—MS molecular sieves are ion exchanged such are preferably exchanged with a hydrogen-forming cation species, e.g. $NH_4^+$, $H^+$, quaternary ammonium cations, etc. The NZ—MS preferably has at least part of its cations as hydrogen-forming cation species.

Hydrodewaxing catalysts may optionally contain a hydrogenation component of the type commonly employed in dewaxing catalysts. The hydrogenation component may be selected from the group of hydrogenation catalysts consisting of one or more metals of Group VI B and Group VIII, including the salts, complexes and solutions containing such metals. The preferred hydrogenation catalyst is at least one of the group of metals, salts and complexes selected from the group consisting of at least one of platinum, palladium, rhodium, iridium and mixtures thereof or at least one from the group consisting of nickel, molybdenum, cobalt, tungsten, titanium, chromium and mixtures thereof. As recognized in the art, the noble and base metals will not generally be employed in the same catalyst system. Reference to the catalytically active metal or metals is intended to encompass such metal or metals in the elemental state or in some form such as an oxide, sulfide, halide, carboxylate and the like.

The hydrogenation component is present in an effective amount to provide an effective hydrodewaxing catalyst. When the hydrogenation catalysts is a noble metal it is generally present in an amount between about 0.05% and about 1.5% by weight based on the total weight of the dewaxing catalyst including the weight of any binder or matrix material which may be present, as hereinafter discussed, although effective amounts outside this range may be employed. Although effective amounts in excess of 1.5 percent by weight may be employed, the preferred effective amount of the noble metal hydrogenation component is between about 0.3% and about 1.2% by weight. When the hydrogenation catalyst is a base metal(s) the effective amount will generally be between about 1.0% and about 30% percent by weight or more of the base metal, expressed as the oxide(s), based on the total weight of the dewaxing catalyst, although effective amounts outside this range may be employed.

The final form of the hydrogenation component is not narrowly limited herein but may be a metal oxide, metal sulfide or other catalytically active form. Since sulfur is typically present in the hydrocarbon feedstock being treated, the actual form of some of the hydrogenation component(s) may well be at least in part a sulfide due to in situ reactions. When a noble metal is employed as the hydrogenation component the catalyst is generally activated in air and then reduced in a hydrogen atmosphere. When base metals are employed such are usually treated with a sulfur compound.

The hydrogenation components can be incorporated into the overall catalyst composition by any one of numerous procedures. In general it has been observed that it is desirable to add the hydrogenation component to the catalyst as a separate component rather than provide such by ion exchange or impregnation of the NZ—MS component. They can be added either to the NZ—MS component, zeolitic aluminosilicate component, if any, or to any metal oxide or to a combination thereof by ion exchange, impregnation and the like. In the alternative, multiple hydrogenation components (two or more) may be added as powders in the formulation of the catalyst. They may be added by co-mulling, impregnation, or ion exchange whereby one or more may be added to NZ—MS and/or zeolitic aluminosilicate by impregnation, co-mulling or co-precipitation. For example, noble or base metal compounds, such as the sulfides, oxides or water-soluble salts, can be added by co-mulling, impregnation or precipitation before the composite is finally calcined. In the alternative these components can be added to the finished particle by impregnation with an aqueous, alcoholic, hydrocarbon or other nonaqueous solution of soluble compounds or precursors.

Although the hydrogenation components can be combined with the NZ—MS and/or zeolitic aluminosilicate, if any, as the oxides such is generally not the case. They are usually added as a metal salt which can be thermally converted to the corresponding oxide in an oxidizing atmosphere or reduced to the metal with hydrogen or other reducing agent. The composition can be sulfided by reaction with a sulfur donor such as carbon disulfide, hydrogen sulfide, hydrocarbon thiols, elemental sulfur, and the like, described above. The above oxidizing or sulfiding processes are generally carried out on catalyst compositions which have been partially dried (as desired), tableted, pelleted, extruded (with binder or matrix), or formed by other means and then calcined, e.g., at a temperature above 600° F., usually above 800° F.

It is well known in the art that dewaxing catalysts, are generally employed with a binder material or, as commonly referred to, with an inorganic oxide matrix which can be inert or also catalytically active. For example inorganic matrices such as silica, alumina, silica-alumina, silica-zirconia, silica-magnesia, alumina-boria, alumina-titania and the like and mixtures thereof may be employed. An inorganic oxide need not always be employed such as in the case of a preform containing the NZ—MS or may be employed in an amount between about 1% and about 95% by weight, preferably between about 10% and about 80% by weight, based on the total weight of the dewaxing catalyst.

The term "crude oil feedstock" is used herein to denominate any crude oil feedstock or portion thereof and includes full range crude oils from primary, secondary or tertiary recovery from conventional or offshore oil fields and to the myriad of feedstocks derived therefrom. "Crude oil feedstocks" may also be "syncrudes" such as those that can be derived from coal, Fischer Tropsch fuel products, shale oil, tar sands and bitumens. The crude oil feedstock may be virgin (straight run) or generated synthetically by blending. Such crude oil feedstocks are traditionally desalted prior to use since sodium chloride is known to be a poison in many hydroprocessing operations. Further, the term "crude oil feedstocks" is intended to include component parts of crude oils which have heretofore been generally employed as feedstocks or potential feeds and includes feeds such as distillate gas oils, heavy vacuum gas oils, VGO, atmospheric and vacuum resids, syncrudes, pulverized coal and fractions boiling above the traditional end of the gasoline boiling range which generally includes compounds containing greater than about eleven carbon atoms and combinations thereof.

The hydrocarbon feedstock for dewaxing typically boils above 350° F., preferably between about 400° F. and 1200° F. and more preferably between about 400° F. and about 900° F. The hydrocarbon feedstock may be pre-treated in a hydrotreater to reduce, i.e. remove, compounds which contain sulfur and/or nitrogen. The hydrocarbon feedstock may have a significant sulfur content, present as hydrogen sulfide, ranging from 0.1 to 3 weight percent, and nitrogen content, present as ammonia, in an amount up to 20,000 ppm. Temperature, space velocity, and other process variables may be adjusted to compensate for the effects of nitrogen on the dewaxing catalyst activity. The feedstock is contacted in the dewaxing reaction zone with the dewaxing catalyst and, optionally, in the presence of hydrogen-containing gas. In hydrodewaxing, hydrogen is consumed in the hydrodewaxing process and an excess of hydrogen is typically maintained in the reaction zone. Advantageously, a hydrgen-to-oil (feed) ratio of at least 1,000 standard cubic feet of hydrogen per barrel of feed (SCFB) is employed, and the hydrogen-to-oil ratio may range up to 20,000 SCFB. Preferably, about 4,000 to 12,000 SCFB is employed. Typically dewaxing and hydrodewaxing conditions are disclosed in U.S. Pat. No. Re 28,398, U.S. Pat. No. 3,852,189 and U.S. Pat. No. 4,282,085.

The instant process is carried out under effective catalystic dewaxing or hydrodewaxing conditions. Catalytic dewaxing is generally carried out at a LHSV (liquid hourly space velocity) between about 0.2 and about 50, a temperature between about 500° F. and about 1200° F., a pressure between about subatmospheric and about 500 atmospheres. Hydrodewaxing is generally carried out at a LHSV between about 0.1 and about 15, a temperature between about 400° F. and about 900° F., at a pressure between about 10 psig and about 2500 psig and using molar ratios of hydrogen to hydrocarbon feedstock between about 1 and about 100.

The following examples were carried out to demonstrate the use of the dewaxing catalysts and dewaxing processes of the invention and are not intended to be limiting thereof.

EXAMPLES 1 to 3

Three catalysts were prepared for evaluation as dewaxing catalysts and were denominated Catalysts A, B and C. All weights are given as hydrous weights unless otherwise designated. The catalysts were prepared as follows:

(a) Catalyst A is a catalyst according to the invention and was prepared using SAPO-11. SAPO-11 was prepared according to example 17 of U.S. Pat. No. 4,440,871, except that the digestion time was 24 hours. Catalyst A was prepared by blending 80 grams of SAPO-11 with 80 grams of a nickel-tungsten-alumina catalyst, 100 grams of a silica sol (40 percent by weight silica in water) and an ammonium acetate solution (4 grams of ammonium acetate in 70 cubic centimeters (cc) of water). The mixture was extruded as 1/16 inch extrudates and dried at 100° C. for about 16 hours and calcined in air at 500° C. for 2 hours. The calcination at 500° C. was carried out in a stepwise manner by heating the catalyst from room temperature to 220° C. over a one hour period, heating the catalyst at 220° C. for 1.5 hours, heating the catalyst from 220° C. to 500° C. over a one hour period and then heating the catalyst at 500° C. for 2 hours. The nickel-tungsten-alumina hydrogenation component was prepared by pore filling 85 grams of a pseudoboehmite alumina with an aqueous solution (119 cc) containing 31.5 grams of Ni(NO$_3$)$_2$.6H$_2$O and 33.7 grams ammonium metatungstate. The mixture was dried as above described for Catalyst A except the final temperature was 480° C. instead of 500° C. Catalyst A, expressed as the weight percent oxides, was prepared to be: 35% SAPO-11, 35% Al$_2$O$_3$, 17% SiO$_2$, 3% NiO and 10% WO$_3$. Chemical analysis of Catalyst A for NiO and WO$_3$ gave 2.8 wt. % NiO and 9.6 wt. % WO$_3$.

(b) Catalyst B was prepared according to this invention using a SAPO-31 prepared according to example 51 of U.S. Pat. No. 4,440,871. SAPO-31 (72 grams) was blended with 46.5 grams of an aqueous silica solution (40 wt. % silica). The mixture was extruded into 1/16 inch pellets which were dried at 100° C. and calcined at 500° C., by the procedure above described for Catalyst A. The calcined extrudates were treated in air (saturated with water at 25° C.) at 650° C. for three hours. The chemical composition of the catalyst was prepared to be 80 wt. % SAPO-31 and 20 wt. % SiO$_2$.

(c) Catalyst C is a comparative catalyst and was prepared using SAPO-34. SAPO-34 was prepared according to the procedure of examples 32 to 38 of U.S. Pat. No. 4,440,871. SAPO-34 is not characterized by an isobutane adsorption of at least 2 percent by weight at a partial pressure of 500 torr and a temperature of 20° C. whereas SAPO-11 and SAPO-31 are so characterized. Catalyst C was prepared by mixing 30 grams of SAPO-34 with 50 grams of an alumina sold under the trade designation "PA" by American Cyanamide, Stamford, CT.), and 20 grams of a pseudobeohomite alumina. The above mixture was mixed with 3 cc of concentrated nitric acid and 50 cc of water and extruded as 1/16 inch extrudates. The extrudates were dried at 100° C. and calcined at 500° C. by the proceduct above described for Catalyst A. The extrudates (53 grams) were pore filled by mixing them with a solution (35 cc) containing 10.7 grams of Ni(NO$_3$)$_2$.6H$_2$O and 20.9 grams of ammonium metatungstate. The extrudates were then dried at 500° C. as above described for Catalyst A. Catalyst C expressed as the weight percent oxides, was prepared to give: 3.5% NiO, 22% WO$_3$, 22.4% SAPO-34 and 52.2% alumina.

EXAMPLE 4

The catalysts of examples 1 to 3 were evaluated for hydrodewaxing and their use in reducing the pour point of hydrocarbon feedstocks by contacting a selected feedstock with hydrogen at a total pressure of 2000 psig at a Liquid Hourly Space Velocity (LHSV) between 0.25 to 0.8 and a hydrogen flow rate of 10,000 SCFB (Standard Cubic Feet per Barrel) at temperatures between about 700° F. and 800° F. Products boiling below 600° F. were collected and evaluated and the conversion given based on these products. The feedstock employed in the dewaxing examples set forth hereinafter was a vacuum gas oil having an IBP (Initial Boiling Point) of 560° F. and a FBP (Final Boiling Point) of 1148° F. (both determined by ASTM test method D-2887), API Gravity of 22.3 and having a pour point of greater than 95° F. The feedstock was characterized by the following physical and chemical characteristics:

|  | Weight Percent |
|---|---|
| Paraffins | 24.1 |
| Mono-naphthens | 9.5 |
| Poly-naphthenes | 8.7 |
| Mono-aromatics | 13.3 |
| Di-aromatics | 9.3 |
| Tri-aromatics | 4.3 |
| Tetra-aromatics | 2.7 |
| Penta-aromatics | 0.7 |

The reactor effluents were collected and the fraction of the feed ("Conversion" on a weight basis) converted to products boiling below 600° F. determined by simulated distillation (ASTM test method D-2887). The conversion is reported as the weight percent of feedstock converted to products boiling below 600° F. The pour points were determined by ASTM test method D-97-66 on the reactor effluents after maintaining the effluent at about 130° F. during its collection. The results in Tables A, B, C and D demonstrate that at comparable conversions that Catalysts A and B provided a reduction in the pour point of the products superior to that obtained by use of Cataysr C. The data in Tables A and C are graphically depicted in FIG. 1 and show the decrease in pour point as a function of conversion of products obtained using SAPO-11 (Catalyst A) as compared to SAPO-34 (Catalyst C). The data in Tables B and D are graphically depicted in FIG. 2 and show the decrease in pour point as a function of conversion of products obtained using SAPO-31 (Catalyst B) as compared to SAPO-34 (Catalyst C). FIGS. 1 and 2 demonstrate the decrease in the pour point of the products obtained by Catalyst A and B as compared to Catalyst C. Further, the decrease in pour point increases at a greater rate using Catalysts A and B with increasing conversion, indicating Catalysts A and B are more selective dewaxing catalyts.

TABLE A

| (CATALYST A) | | | |
|---|---|---|---|
| Temp., °F. | LHSV | Conv. | Pour Point, °F. |
| 701 | 0.25 | 17.3 | 40 |
| 749 | 0.25 | 39.8 | −15 |
| 725 | 0.25 | 28.5 | 10 |

TABLE B

| (CATALYST B) | | | |
|---|---|---|---|
| Temp., °F. | LHSV | Conv. | Pour Point, °F. |
| 725 | 1.0 | 4.3 | 75 |
| 749 | 1.0 | 6.9 | 65 |
| 772 | 1.0 | 13.0 | 50 |
| 801 | 1.0 | 26.5 | 25 |

TABLE C

| (CATALYST C) | | | |
|---|---|---|---|
| Temp., °F. | LHSV | Conv. | Pour Point, °F. |
| 702 | 0.25 | 17.6 | 85 |
| 725 | 0.25 | 23.3 | 80 |
| 750 | 0.25 | 35.0 | 75 |

TABLE C-continued

| (CATALYST C) | | | |
|---|---|---|---|
| Temp., °F. | LHSV | Conv. | Pour Point, °F. |
| 774 | 0.25 | 7.1 | 60 |

TABLE D

| (CATALYST C) | | | |
|---|---|---|---|
| Temp., °F. | LHSV | Conv. | Pour Point, °F. |
| 776 | 1.0 | 29.9 | 80 |
| 753 | 1.0 | 18.1 | 85 |
| 752 | 1.0 | 17.0 | 85 |

EXAMPLE 5

A catalyst was prepared employing SAPO-11 to demonstrate the hydrocracking and dewaxing functionality of the catalysts of this invention. SAPO-11 was prepared according to the procedure described in example 18 of U.S. Pat. No. 4,440,871, except the final molar ratio of di-n-propylamine to $Al_2O_3$ was 1.0 to 1. The catalyst was prepared by mixing 150 grams of SAPO-11 with 100 grams of Kaiser medium density alumina and a sufficient amount of water to form an extrudate mixture (paste). The mixture was extruded into 1/16 inch extrudates and dried in air at 100° C. for 16 hours. The extrudates were then calcined in air at 480° C. for 2 hours. The extrudates (153 gram) were then mixed (pore filled) with 150 cc of an aqueous solution containing 40.0 grams of nickel nitrate hexahydrate and 48 grams of ammonium metatungstate. The mixture was then dried for 16 hours at 100° C. and then calcined at 480° C. for 2 hours. The catalyst was prepared to contain, given as the weight percent oxide: 5 wt. % NiO; 23 wt. % $WO_3$; 36 wt. % SAPO-11; and 36% $Al_2O_3$. Chemical analysis for NiO and $WO_3$ gave 5.4 wt. % NiO and 23.0 wt. % $WO_3$.

The catalyst was evaluated by contacting a selected feedstock with hydrogen at a total pressure of 2000 psig at a Liquid Hourly Space Velocity (LHSV) of one and a hydrogen flow rate of 10,000 SCFB (Standard Cubic Feed per Barrel) at temperatures between about 700° F. and 840° F. Products boiling below 600° F. were collected and evaluated and the conversion given based on these products. The feedstock employed in this example was a vacuum gas oil having an IBP (Initial Boiling Point) of 560° F. and a FBP (Final Boiling Point) of 1148° F. (both determined by ASTM test method D-2887), API Gravity of 22.3 and having a pour point of greater than 95° F. The feedstock was characterized by the following physical and chemical characteristics:

| | Weight Percent |
|---|---|
| Paraffins | 24.1 |
| Mono-naphthenes | 9.5 |
| Poly-naphthenes | 8.7 |
| Mono-aromatics | 13.3 |
| Di-aromatics | 9.3 |
| Tri-aromatics | 4.3 |
| Tetra-aromatics | 2.7 |
| Penta-aromatics | 0.7 |

The reactor effluents were collected and the fraction of the feed (weight basis) converted to products boiling below 600° F. determined by simulated distillation. The conversion is reported as the weight percent of feedstock converted to products boiling below 600° F. The pour points were determined according to ASTM test method D-97-66 as in example 4.

The conversion and pour point were as follows:

| Temperature (°F.) | Conversion | Pour Point (°F.) |
|---|---|---|
| 700 | 7.52 | 85 |
| 724 | 9.84 | 80 |
| 749 | 17.95 | 70 |
| 769 | 30.06 | 55 |
| 788 | 41.60 | 25 |
| 797 | 36.64 | 35 |
| 788 | 29.89 | 40 |
| 788 | 33.74 | 45 |
| 807 | 43.64 | 30 |
| 821 | 45.12 | 30 |
| 822 | 45.50 | 30 |
| 840 | 56.88 | 20 |

The above data demonstrate the conversion of the higher boiling feedstock to lower boiling products in the presence of hydrogen and that such products are characterized by a lower pour point than the initial feedstock.

What is claimed is:

1. A dewaxing catalyst comprising at least one NZ—MS selected from the group consisting of SAPO, ELAPSO, MeAPO, FeAPO, TiAPO and ELAPO molecular sieves characterized in its calcined form by an adsorption of isobutane of at least 2 percent by weight at a pressure of 500 torr and a temperature of 20° C., and at least one metal selected from the group consisting of nickel, cobalt, tungsten, molybdenum, platinum, palladium, chromium, iridium, rhodium, ruthenium and titanium.

2. The catalyst of claim 1 wherein said NZ—MS molecular sieve is further characterized in its calcined form by an adsorption of triethylamine of from zero to less than 5 percent by weight at a pressure of 2.6 torr and a temperature of 22° C.

3. The catalyst of claim 1 wherein said catalyst contains at least one zeolitic aluminosilicate selected from the group consisting of zeolite Y, ultra-stable zeolite Y, zeolite X, zeolite beta, zeolite KZ-20, faujasite, LZ-210, LZ-10, ZSM-type zeolites and mixtures thereof.

4. The catalyst of claim 3 wherein said catalyst contains from 1 to 99 percent by weight of at least one inorganic oxide matrix component.

5. The catalyst of claim 4 wherein the inorganic oxide matrix component is selected from the group consisting of clays, silicas, aluminas, silica-aluminas, silica-zirconias, silica-magnesia, alumina-borias, alumina-titanias and mixtures thereof.

6. The catalyst of claim 1 wherein said NZ—MS is selected from the group consisting of CoAPSOs, FeAPOs, MgAPSOs, MnAPSOs, TiAPSO, ZnAPSOs, CoMgAPSOs, CoMnMgAPSOs, MgAPOs, MnAPSOs, TiAPOs FeAPOs, ELAPOs, SAPOs and mixtures thereof.

7. The catalyst of claim 6 wherein said zeolitic aluminosilicate is selected from the group consisting of Y zeolite, ultra-stable zeolite Y, LZ-210, LZ-10, ZSM-5 and mixtures thereof.

8. The catalyst of claim 2 wherein said catalyst contains at least one zeolitic aluminosilicate selected from the group consisting of zeolite Y, ultra-stable zeolite Y, zeolite X, zeolite beta, zeolite KZ-20, faujasite, LZ-210, LZ-10, ZSM-type zeolites and mixtures thereof.

9. The catalyst of claim 8 wherein said catalyst contains from 1 to 99 percent by weight of at least one inorganic oxide matrix component.

10. The catalyst of claim 9 wherein the inorganic oxide matrix component is selected from the group consisting of clays, silicas, aluminas, silica-aluminas, silica-zirconias, silica-magnesia, alumina-borias, alumina-titanias and mixtures thereof.

11. The catalyst of claim 2 wherein said NZ—MS is selected from the group consisting of CoAPSOs, FeAPOs, MgAPSOs, MnAPSOs, TiAPSO, ZnAPSOs, CoMgAPSOs, CoMnMgAPSOs, MgAPOs, MnAPOs, TiAPOs, FeAPOs, ELAPOs, SAPOs and mixtures thereof.

12. The catalyst of claim 11 wherein said zeolitic aluminosilicate is selected from the group consisting of Y zeolite, ultra-stable zeolite Y, LZ-210, LZ-10, ZSM-5 and mixtures thereof.

13. The catalyst of claim 3 wherein said ZSM-type zeolite is selected from the group consisting of ZSM-5, ZSM-11, ZSM-12, ZSM-23, ZSM-35, ZSM-38 and ZSM-40.

14. The catalyst of claim 8 wherein said ZSM-type zeolite is selected from the group consisting of ZSM-5, ZSM-11, ZSM-12, ZSM-23, ZSM-35, ZSM-38 and ZSM-40.

15. The catalyst of claim 3 wherein the ratio between said zeolitic aluminosilicate and said NZ—MS is between about 1:10 and about 500:1.

16. The catalyst of claim 8 wherein the ratio between said zeolitic aluminosilicate and said NZ—MS is between about 1:10 and about 500:1.

17. The catalyst of claim 1 wherein said metal comprises at least one of nickel and tungsten.

18. The catalyst of claim 2 wherein said metal comprises at least one of nickel and tungsten.

19. The catalyst of claim 1 wherein said metal comprises at least one of platinum and palladium.

20. The catalyst of claim 2 wherein said metal comprises at least one of platinum and palladium.

21. The catalyst of claim 1 wherein said at least one NZ—MS comprises at least one SAPO.

22. The catalyst of claim 2 wherein said at least one NZ—MS comprises at least one SAPO.

23. The catalyst of claim 1 wherein said at least one NZ—MS comprises at least one ELAPSO selected from MgAPSOs and MnAPSOs.

24. The catalyst of claim 2 wherein said at least one NZ—MS comprises at least one ELAPSO selected from MgAPSOs and MnAPSOs.

25. The catalyst of claim 1 wherein said at least one NZ—MS comprises MgAPSO-31.

26. The catalyst composition of claim 1 wherein said catalyst further contains at least one silicalite active as a component in dewaxing catalysts, present in a weight ratio between about 1:10 and about 500:1 of said silicalite to said NZ—MS.

* * * * *